United States Patent
Kay et al.

(10) Patent No.: US 9,135,445 B2
(45) Date of Patent: Sep. 15, 2015

(54) PROVIDING INFORMATION ABOUT A WEB APPLICATION OR EXTENSION OFFERED BY WEBSITE BASED ON INFORMATION ABOUT THE APPLICATION OR EXTENSION GATHERED FROM A TRUSTED SITE

(75) Inventors: Erik Kay, Belmont, CA (US); Mihai Parparita, Mountain View, CA (US); Aaron Boodman, San Francisco, CA (US); Rahul Roy-Chowdhury, Redwood City, CA (US)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 13/423,903

(22) Filed: Mar. 19, 2012

(65) Prior Publication Data

US 2013/0247030 A1   Sep. 19, 2013

(51) Int. Cl.
| | |
|---|---|
| G06F 9/445 | (2006.01) |
| G06F 21/57 | (2013.01) |
| G06F 21/60 | (2013.01) |
| H04L 29/08 | (2006.01) |
| H04L 29/06 | (2006.01) |
| G06Q 30/06 | (2012.01) |

(52) U.S. Cl.
CPC ...... *G06F 21/57* (2013.01); *G06F 8/60* (2013.01); *G06F 21/602* (2013.01); *G06Q 30/0601* (2013.01); *H04L 63/1441* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,233,618 | B1* | 5/2001 | Shannon | 709/229 |
| 6,546,554 | B1* | 4/2003 | Schmidt et al. | 717/176 |
| 6,959,382 | B1* | 10/2005 | Kinnis et al. | 713/170 |
| 7,596,610 | B2* | 9/2009 | Faisal et al. | 709/220 |
| 8,019,794 | B2* | 9/2011 | Pathak et al. | 707/803 |
| 8,108,926 | B2* | 1/2012 | Haller | 726/18 |
| 8,196,206 | B1* | 6/2012 | Gartside et al. | 726/24 |

(Continued)

OTHER PUBLICATIONS

Penn State College of Agricultural Sciences, "Install Updates to Adobe Flash Player," 2011, downloaded from the Wayback Machine Internet Archive on Nov. 13, 2013, <url>:http://web.archive.org/web/20110916153753/http://agsci.psu.edu/it/how-to/install-updates-to-adobe-flash-player, pp. 1-2.*

(Continued)

*Primary Examiner* — Thuy Dao
*Assistant Examiner* — Stephen Berman
(74) *Attorney, Agent, or Firm* — Brake Hughes Bellermann LLP

(57) ABSTRACT

A method for installing an offered web application or browser extension in a web browser includes receiving a user action on a website located at a first internet domain. Information about the offered web application or browser extension not currently installed in the web browser is displayed in response to the user action. The displayed information is provided by a digital marketplace located at a second internet domain distinct from the first internet domain. A correspondence of the displayed information to the offered web application or browser extension is ensured through functionality provided by the web browser. An indication to install the offered web application or browser extension is received from a user, and the web application or browser extension is installed in response to the received indication.

18 Claims, 6 Drawing Sheets

(56) References Cited

U.S. PATENT DOCUMENTS

| | | | |
|---|---|---|---|
| 2002/0046109 | A1 | 4/2002 | Leonard et al. |
| 2003/0046097 | A1* | 3/2003 | LaSalle et al. .................... 705/1 |
| 2006/0212548 | A1* | 9/2006 | Faisal et al. ................... 709/220 |
| 2006/0253851 | A1* | 11/2006 | Cho et al. ....................... 717/175 |
| 2006/0294587 | A1* | 12/2006 | Bowden et al. ................. 726/22 |
| 2007/0204151 | A1* | 8/2007 | Schnackenberg et al. .... 713/161 |
| 2008/0235680 | A1* | 9/2008 | Strauss et al. ................. 717/178 |
| 2009/0187763 | A1* | 7/2009 | Freericks et al. ............. 713/167 |
| 2010/0125733 | A1* | 5/2010 | Kim et al. ..................... 713/169 |
| 2010/0274668 | A1* | 10/2010 | Langston et al. .......... 705/14.55 |
| 2011/0004504 | A1* | 1/2011 | Ives et al. ......................... 705/10 |
| 2011/0154316 | A1* | 6/2011 | Khosravi et al. ............. 717/173 |
| 2011/0263296 | A1* | 10/2011 | Baietto et al. ................. 455/558 |
| 2011/0314389 | A1* | 12/2011 | Meredith et al. ............. 715/751 |
| 2012/0042289 | A1* | 2/2012 | Cragun et al. ................. 715/865 |
| 2012/0079267 | A1* | 3/2012 | Lee ................................ 713/156 |
| 2013/0185802 | A1* | 7/2013 | Tibeica et al. ................. 726/26 |

OTHER PUBLICATIONS

Adobe, "Install a different version of Adobe Flash Player," 2011, downloaded from the Wayback Machine Internet Archive on Nov. 13, 2013, <url>: http://web.archive.org/web/20110916152351/http://get.adobe.com/flashplayer/otherversions/, 1 page.*

Wikipedia, "Mirror (computing)", 2011, downloaded from the Wayback Machine Internet Archive on Nov. 14, 2013 at <url>: http://web.archive.org/web/20110914175032/http://en.wikipedia.org/wiki/Mirror_(computing), pp. 1-3.*

Wikipedia, "Metalink", 2011, downloaded from the Wayback Machine Internet Archive on Nov. 14, 2013 at <url>: http://web.archive.org/web/20111020072004/http://en.wikipedia.org/wiki/Metalink, pp. 1-8.*

McPherson, "Android App Permissions Explained," 2010, downloaded from the Internet on Nov. 13, 2013 at <url>: http://socialtimes.com/android-app-permissions-explained_b47761, pp. 1-4.* eGuideDog Team, "eGuideDog Downloads," 2011, downloaded from the Internet on Aug. 22, 2014 from <url>:http://web.archive.org/web/20110211222854/http://www.eguidedog.net/download.php, pp. 1-3.*

Google, "WebAnywhere," pp. 1-2, downloaded from the Internet on Aug. 22, 2014 from <url>: http://web.archive.org/web/20111224082750/http://code.google.com/p/webanywhere/downloads/list and http://web.archive.org/web/20100228060033/http://code.google.com/p/webanywhere/downloads/detail?name=wa.0.02.zip&can=2&q=.*

Bin et al., "A DNS Based Anti-phishing Approach," 2010, Second International Conference on Networks Security Wireless Communications and Trusted Computing (NSWCTC), vol. 2, pp. 262-265.*

Shahriar et al., "Trustworthiness testing of phishing websites: A behavior model-based approach," 2011, Future Generation Computer Systems, vol. 28, Issue 8, pp. 1258-1271.*

He et al., "An efficient phishing webpage detector," 2011, Expert Systems with Applications, vol. 38, Issue 10, pp. 12018-12027.*

Search Report and Written Opinion for International Application No. PCT/US2013/032032, mailed Jun. 4, 2013, 33 pages.

International Preliminary Report on Patentability for PCT Patent Application No. PCT/US2013/032032, issued on Sep. 23, 2014, 6 pages.

* cited by examiner

PROVIDING INFORMATION ABOUT A WEB APPLICATION OR EXTENSION OFFERED BY WEBSITE BASED ON INFORMATION ABOUT THE APPLICATION OR EXTENSION GATHERED FROM A TRUSTED SITE

TECHNICAL FIELD

This disclosure generally relates to installation of web applications and browser extensions, and more particularly to providing information about a web application or browser extension available for installation from a website.

BACKGROUND

Traditionally, personal computing hardware and software systems followed a model where users explicitly made trust decisions about every new piece of software installed and run on computer hardware. For instance, a user could install software by inserting a compact disk (CD) into a computer system. The user was responsible for the safety of the installed software.

Different security issues, however, may arise for software applications that are delivered to computers via the Internet via, for example, a web browser. For example, large companies may not wish to automatically trust each application that individual employees download. As another example, a developer may host an installable application on its own server. This may make users doubtful about installing the application, because installing from a trusted website (e.g., a digital marketplace or web store hosted by a server) is supposed to be safer.

Users need a way to learn more about web applications or browser extensions offered from a developer's server or via a developer's website, before installing them. It would be beneficial to allow users to validate information, read reviews, or learn about permission requirements of web applications or browser extensions offered from a developer's server or via the developer's website, without having to navigate away from a developer's website.

SUMMARY

According to one general aspect, a method for installing an offered web application or browser extension in a web browser includes receiving a user action on a website located at a first internet domain. Information about the offered web application or browser extension not currently installed in the web browser is displayed in response to the user action. The displayed information is provided by a digital marketplace located at a second internet domain distinct from the first internet domain. A correspondence of the displayed information to the offered web application or browser extension is ensured through functionality provided by the web browser. An indication from the user to install the offered web application or browser extension is received, and the web application or browser extension is installed in response to the received indication.

According to another general aspect, a system for installing an offered web application or browser extension in a web browser includes a display, one or more memory devices arranged and configured to store executable code, and one or more processors operably coupled to the one or more memory devices. The one or more processors are arranged and configured to execute the code such that the system receives a user action on a website located at a first internet domain. The system displays information about the offered web application or browser extension not currently installed in the web browser in response to the user action. The displayed information is provided by a digital marketplace located at a second internet domain distinct from the first internet domain. A correspondence of the displayed information to the offered web application or browser extension is ensured through functionality provided by the web browser. The system receives an indication from the user to install the offered web application or browser extension, and installs the web application or browser extension in response to the received indication.

According to yet another general aspect, a non-transitory computer readable medium includes executable code that, when executed, is configured to cause a computing device to receive a user action on a website located at a first internet domain, and display information about the offered web application or browser extension not currently installed in the web browser in response to the user action. The displayed information may be provided by a digital marketplace located at a second internet domain distinct from the first internet domain, and a correspondence of the displayed information to the offered web application or browser extension may be ensured through functionality provided by the web browser. The computing device may receive an indication from the user to install the offered web application or browser extension, and install the web application or browser extension in response to the received indication.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
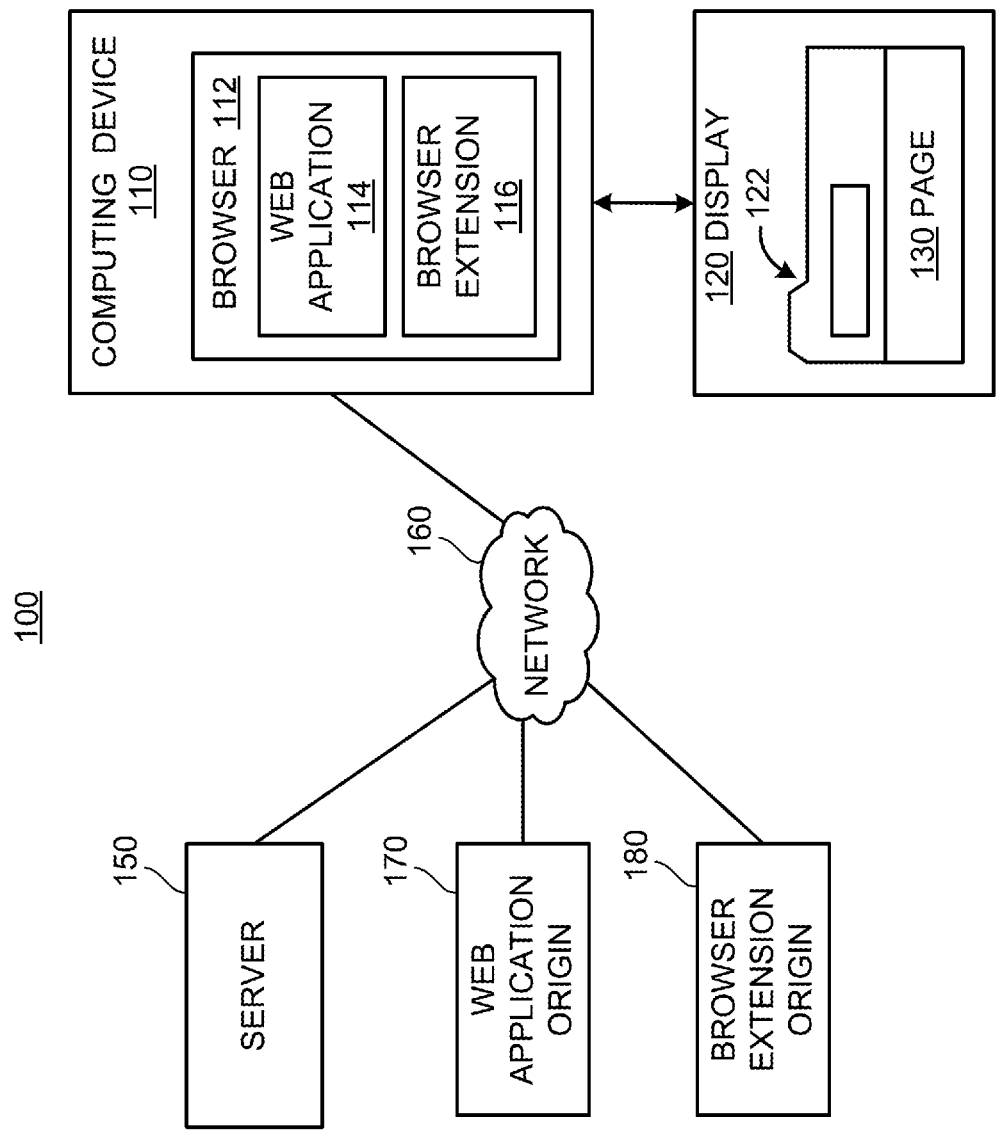
FIG. 1 illustrates an example system in accordance with the disclosed subject matter.

A web browser executed by a client device can receive code (e.g., HTML code) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client device, whereas a web application may be incapable of execution or display without the aid of the web browser. Thus, web applications can be run inside a browser with a dedicated user interface, and typically provide functionality and an experience that is more rich and interactive than a standalone website but less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

When installable web applications are "installed" by the user, the web applications may be added to and integrated with the user's web browser. Installation can include adding a shortcut to an application launcher area of the browser. An installation also allows web applications to obtain increased privileges without having to prompt the user for each one individually. Special user interface treatments may apply for the web application's tabs or windows. "Installing" a web application may include integration with: a client's operating system's task and window managers for easy window switching, a taskbar or quick-launch system, interoperating system notification(s), or persistently running background processes. Uninstallation allows for easy removal or deactivation of an installed application from the user's browser or system, and may include revoking all associated privileges. A server-side flag can be used to disable applications remotely. "Installation" may include a user action (e.g., selection of a link or icon), fetching the data to be installed (e.g., downloading data), and processing the data so that the application appears locally (e.g., in an application launcher).

Inline Installation

Browser extensions and web applications can be created for installation in and execution by a browser running on a client computing device. Users may download browser extensions and web applications from a trusted location, such as a digital marketplace maintained by a reputable and trusted provider that hosts and provides browser extensions and/or web applications written by hundreds or thousands of different developers. Additionally, users may download browser extensions and web applications from a location that is not necessarily trusted, such as a website that is operated by a developer of the browser extension or web application. Downloading and installing a browser extension or web application from a developer's website or other third party website that is not necessarily trusted (i.e., referred to herein as a "developer originated website") is referred to herein as "inline installation." When users install applications that are offered from the developer originated website, the applications may be downloaded from the developer's own server. This may make users doubtful about installing the application, for example if they do not trust the developer originated website. However, with "inline" installation, developers and webmasters of sites providing developer-originated content get the advantage of keeping a visitor glued to their website, and visitors get to install an application without having to navigate to a marketplace hosted by the trusted site. In some implementations, the user may download the web application or browser extension (e.g., in a .crx file) from the trusted server directly, without navigating away from the developer originated website. For example, a user may view a dialog box providing information about the web application or browser extension, and then click a graphical icon or link to download and install the web application or browser extensions directly from the trusted server (and not from the developer originated server). In other implementations, the user may download the web application or browser extension from the developer originated server, but before installing the downloaded web application or browser extension, the user may verify that the web application or browser extension matches an item in the dialog box (e.g., via a cryptographic signature). Prior to inline installation of a browser extension or web application, users may receive information from another source (such as a digital marketplace hosted by a trusted site) to confirm that a browser extension or web application offered by a developer originated website is trustworthy, without having to navigate away from the developer originated website. Thus, users may discover information about the web applications and browser extensions from the trusted third party and can use that information to limit access of certain web applications or browser extensions prior to installation, for example to ensure privacy. In some implementations, and as discussed in more detail below, a user may modify at least one permission requested by a web application prior to inline installation, where the granting of a permission may allow the web application to have a greater degree of functionality when executed by the browser then normal HTML code available from a website. For example, a user may learn from a trusted third-party that a default setting for a web application that the user is interested in downloading and installing from a developer-originated website requests access to all browsing history and a location of the user. The user may, prior to or after installation of the web application, prevent the web application from accessing the browsing history, but allow the web application to access the user's location.

In some implementations, a developer website may contain one or more links (e.g., <link rel="digital-webstore-item" href="https://digital.google.com/webstore/detail/item/D">HTML tags), for example in the <head> section. The URL usedin the tag can be the URL of a digital marketplace item (such as a web application or browser extension) that is provided by the trusted third-party. The URL may have an HTTPS scheme, and may not contain any other query parameters. For example, the <link> tag for a Digital Docs app may state: <link rel="digital-webstore-item" href="https://digital.software.com/webstore/detail/apdfllck-aahabafndbhieahigkjlhalf">. To begin inline installation, a function (e.g., JavaScript function) may be called in response to a user gesture, for example within a click event handler.

Computing Network

FIG. 1 is a block diagram of a computing network 100 in accordance with an example embodiment. The network 100 may be used to implement web applications and browser extensions using the techniques described herein. The depiction of network 100 in FIG. 1 is shown by way of example. It will be appreciated that other network configurations may be used for implementing such techniques.

The network 100 includes at least one computing device 110. The computing device 110 may take the form of a number of different devices, such as a personal computer, laptop computer, tablet computer, netbook computer, or a web-enabled phone, as examples. The device 110 includes a browser application 112 that may be used to access various types of content. Such content may include web sites, photos, video, audio and executable scripts, for example. As shown in FIG. 1, browser application 112 includes web application 114 and browser extension 116, which may be installed on the computing device 110 using the techniques described herein and, once installed, may operate as an integrated part of the browser 112. The web application 114 may include respective client-side components of the application. Depending on the particular implementation, the web application 114 may include a description of the web application and/or code that is executable by the browser application 112, where that code provides functionality for the web application. Computing device 110 may provide, using a display 120, a browser window 122 which displays a page 130, the code for which is stored at a remote device (e.g., one of a server 150, web application origin 170, or browser extension origin 180).

In the network 100, the computing device 110 is coupled with a network 160. The network 160 may include a data access network that provides access to the Internet and/or the World Wide Web. Via the network 160, computing device 110 (using browser 112, for example) may communicate with a server 150 (e.g., a web application server or web store), a web application origin 170 and a browser extension origin 180. In this example, the web application origin may comprise server-side components for one or more web applications 114. The browser extension origin 180 may comprise server-side components for the browser extension 116. The web application 114 and browser extension 116 may operate using multiple origins. Therefore, the web application 114 may have server-side components on multiple web application origins, for example.

In one implementation, the server 150 may be configured to receive requests from user computing devices (such as the computing device 110) for installation of web applications and browser extensions, and to provide, in response to such requests, installation procedures (or installation packages) for the web applications or browser extensions. Such installation procedures/packages may include, at least, the client-side component for a requested web application.

In some implementations, the server 150 may verify a website hosted by web application origin 170 or browser extension origin 180. For example, a developer of web application origin 170 may verify that he owns a domain, for example by accessing DNS settings for the domain, uploading an HTML file to the domain's web server, or adding a <meta> tag to a home page. The developer may then associate a web application or browser extension with a verified domain. For security reasons, in some implementations, inline installations can only be initiated by a page on a website that is verified as being associated with that item in a digital marketplace. If a developer verifies ownership for a domain (for example, http://example.com) the developer can initiate inline installation from any subdomain or page (for example, http://app.example.com or http://example.com/page.html).

In some implementations, the server 150 may be configured to receive requests from web application origin 170 or browser extension origin 180 for information about the installation of web applications and browser extensions, and to provide, in response to such requests, information associated with the web applications or browser extensions. Such information can include, at least, permissions, user ratings, numbers of users, security features, reviews, file sizes, versions, capabilities, and metadata.

In the arrangement shown in FIG. 1, browser application 112 may be used to request installation of the web application 114 and browser extension 116 by interacting with the server 150, web application origin 170, or browser extension origin 180. For instance, the digital marketplace 150 may implement a website that is used to distribute a large number of web applications that may be developed by a large number of distinct developers, among other content. The marketplace can be trusted because of the reputation of the company (e.g., Google, Microsoft, Apple) that hosts the marketplace and because the policies implemented by the host company, for example. As an example, the server 150 may implement an e-commerce site or other trusted website. Server 150 may acquire web applications and browser extensions from many distinct developers, for example from web application origin 170 or browser extension origin 180. Alternatively or additionally, equivalent versions of web applications and browser extensions may be stored and may be available for download (e.g., using inline installation, as discussed in more detail below with respect to FIG. 4) from web application origin 170 or browser extension origin 180.

Requests to install web applications may be included in messages from the computing device 110 to the server 150 that indicate agreement to purchase respective web applications. Alternatively or additionally, requests to install web applications may be included in messages from the computing device 110 to the web application origin 170 or browser extension origin 180 that indicate agreement to purchase respective web applications or browser extensions. In other implementations, the server 150 may take other forms or implement other techniques, such as providing access to free web applications, or may take the form of a developer's website, which provides access to web application installation procedures/packages. In some implementations, installing a web application may include editing specific permissions for the web application.

The specific actions performed when installing a web application may vary depending on the particular implementation and/or the particular web application. In an example implementation, installing a web application may include installing an icon that corresponds with the web application in an application launcher area of a web browser application. A user may then interact with this icon to launch the web application. In another example implementation, installing a web application may include syncing the web application across multiple computing devices (e.g., mobile phones, smart phones, tablets, laptops, desktops) that a user accesses, for example from different locations at different times (e.g., using the same login credentials). In another implementation, installing a web application may include granting specific permissions for the web application to perform specific actions that otherwise would not be allowable for HTML code received from a website and executed by a browser on a client. For example, a user may grant specific permissions for the web application to access the user's browsing history, profile information, social media contacts, or other information.

In other implementations, installing a web application may include starting a background page for the web application, if the web application includes a background page feature. A background page of a web application may enable the web application to run as soon as the user logs into their computer, including before the user launches a web browser application or launches the associated web application in the web browser application. A background page may include an invisible element running in a browser application, where the background page includes a declared association, in the web browser application, with the installed web application.

While network 100 illustrates only a single server 150, web application origin 170, and browser extension origin 180, it will be appreciated that additional digital marketplaces, servers, or origins may be included in network 100, and that web application origin 170 and browser extension origin 180 may be combined. Similarly, it will be appreciated that any number of computing devices 110 may be included in network 100, and that web application 114 and browser extension 116 may be synchronized across multiple computing devices associated with a user, for example using a user account.

In some implementations, the web application origin 170 and browser extension origin 180 may implement one or more websites that the computing device 110 (e.g., using browser application 112) may interact with to request installation of web application 114 and browser extension 116. As an example, web application 114 may be a packaged application, which includes a manifest file that may include permissions (e.g., permissions to use local resources or do other things normal HTML code is not permitted to do, such as access browsing history with permission from a user) and at least one HTML file to provide a user interface, along with other files, such as image files. Browser extension 116 may also include a manifest file and an HTML file. In some implementations, prior to, during, or after inline installation from a developer originated website, the developer originated website may provide information about a web application, as discussed in more detail below with respect to FIG. 4. The information may be provided in response to a user prompt triggering the inline installation from the developer originated website (e.g., a user click on an install button on the developer originated website). The information may be received from server 150, and may include a permission requested by the web application 114 or browser extension 116, user reviews, an average rating, a numbers of user, capabilities, file size, author, or other information.

In some implementations, server 150 may be trusted because it includes a manual review management component, i.e., people review suspicious web applications and browser extensions for security issues, bugs, etc. A browser extension or web application may be allowed to be posted to the marketplace only if the people determine that the browser extension or web application satisfies particular security conditions. Further, server 150 may be trusted because it may be operated by the same company that develops browser application 112, for example, as well as operating systems used to execute web applications and browser extensions. In contrast, other origins (e.g., web application origin 170 and browser extension origin 180) may be less trusted because they are not known to include the same levels of manual review or other scrutiny as server 150, and because other origins may not provide trusted browsers or operating systems, for example. Server 150 may also be trusted because it is associated with a trusted website, such as a web store.

Browser application 112 may also provide feedback to server 150 (or web application origin 170 or browser extension origin 180) about the local usage of a web application on the client computing device. By receiving such feedback from client computing device(s) 110, server 150 may gather information about how an application is actually used and about any security issues a user encounters after the application is downloaded from the server 150, for example. Thus, server 150 may analyze digital goods based on signals related to security issues, where such signals may include signals based on information about how applications actually perform after the applications are downloaded from the server 150 and installed on a client computing device. For example, users may report malware or bugs to server 150. Such information may be provided to server 150 on an opt-in basis.

Figure 2:
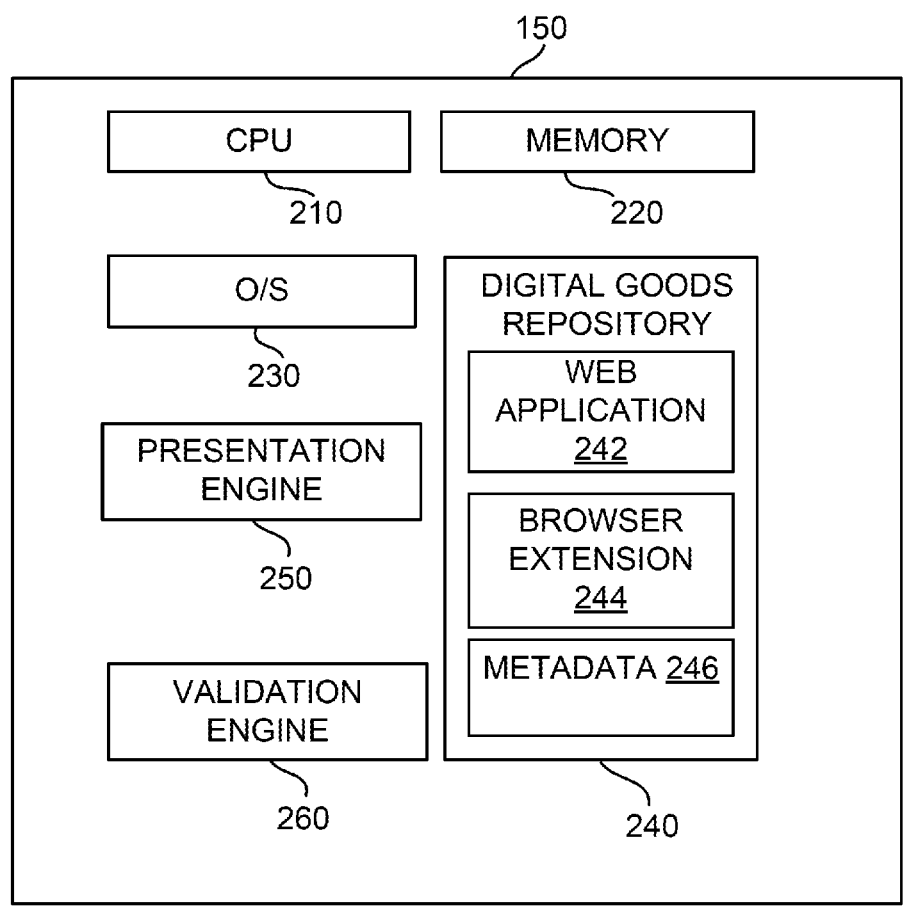
FIG. 2 is illustrates an example server.

FIG. 2 illustrates a block diagram of a server. Server 150 may include one or more processors 210 and one or more memories 220. The server 150 may execute an operating system (O/S) 230 and various applications and services to provide functionality to client computing devices. For example, in one implementation, the server 150 may include a digital goods repository 240 (e.g., a database or other data store) including a web application 242 and browser extension 244. The digital goods may be served from, or downloaded from, the digital goods repository 240 to the client computing devices (e.g., computing device 110 shown in FIG. 1). In some implementations, the digital goods may be manually reviewed to before being offered to client computing devices, for example to detect or prevent security problems, or to categorize the digital goods.

In certain implementations, the digital goods and related data may be stored in, and served to client computing devices from, a repository that is remotely located from the server 150. For example, digital goods could be stored and served to client computing devices from individual repositories that are operated and controlled by developers of the digital goods (e.g., web application origin 170 or browser extension origin 180 as shown in FIG. 1), and digital goods repository 240 of the server 150 may provide a reference to the individual repositories that are operated by the developers.

Digital goods repository 240 stores metadata 246 associated with the digital goods that are available from or referenced by the digital goods repository 240. The metadata 246 associated with a digital good may include a variety of information about the digital goods including, for example, information about the digital goods that are available from the repository 240. Such information may include, for example, representative keywords associated with the digital goods, the price associated with the digital goods, an author/creator/developer of the digital goods, credentials of the developer, permissions requested by the digital goods, optional capabilities, file size, reviews, user ratings, and other features of the digital goods. Examples of permissions requested by the digital goods include access to: physical location of a user (e.g., geolocation), data on websites, data on a specific domain (e.g., www.bbc.com), tabs and browsing activity (e.g., URLs, titles), browsing history, desktop notifications, a storage quota, a computer camera, a computer microphone, private data, or lists of installed web applications, extensions, and themes.

The metadata may also include demographic data about targeted users of the digital good, a time of year month or day during which the digital goods may be of the highest interest to a user, or other information. The metadata may also include user reviews, a number of users of each digital goods (e.g., number of users who have downloaded or installed the digital goods), and reviews of the digital goods.

The server 150 may include a presentation engine 250 that prepares information for transmission to the client computing devices 110A and 110B shown in FIG. 1, where the information is used by the client computing devices to display a user interface that shows representations of selected digital goods available in the marketplace, as described in more detail below with respect to FIG. 4.

Website Verification

The server 150 may also include a validation engine 260 that validates versions of digital goods as compared to versions of digital goods from developer originated websites (e.g., hosted by web application origin 170 or browser extension origin 180). In some implementations, validation engine 260 uses site verification to verify developer originated websites, to ensure that a web application from a website is trustworthy, for example. A developer may verify that he owns a domain, for example by accessing DNS settings for the domain, uploading an HTML file to the domain's web server, or adding a <meta> tag to a home page. The developer may then associate a web application or browser extension with a verified domain. In such an implementation, inline installation can only be initiated by a page on that web application's domain (such that a developer cannot trigger an inline installation for an application that they do not own). As an example, if a developer verifies ownership for a domain (such as http://example.com), he can initiate inline installation from any subdomain or page (e.g., http://app.example.com or http://example.com/page.html).

The information that is provided by a client device or a developer website to the server 150 (e.g., profile information, location, requests, etc.) may be provided on an opt-in basis. In other words, such information may be provided from the computing device 110 to the server 150 only if the user of the computing device specifically authorizes the transmission of such information from the computing device to the server. Further, in some implementations, security-related information may be reported to users that have opted to receive such information, such as to a user who opted to receive security notifications when the user downloaded an application. In addition, data may be anonymized in one or more ways before it is sent, so that personally identifiable information is removed.

Digital Marketplace User Interface

Figure 3:
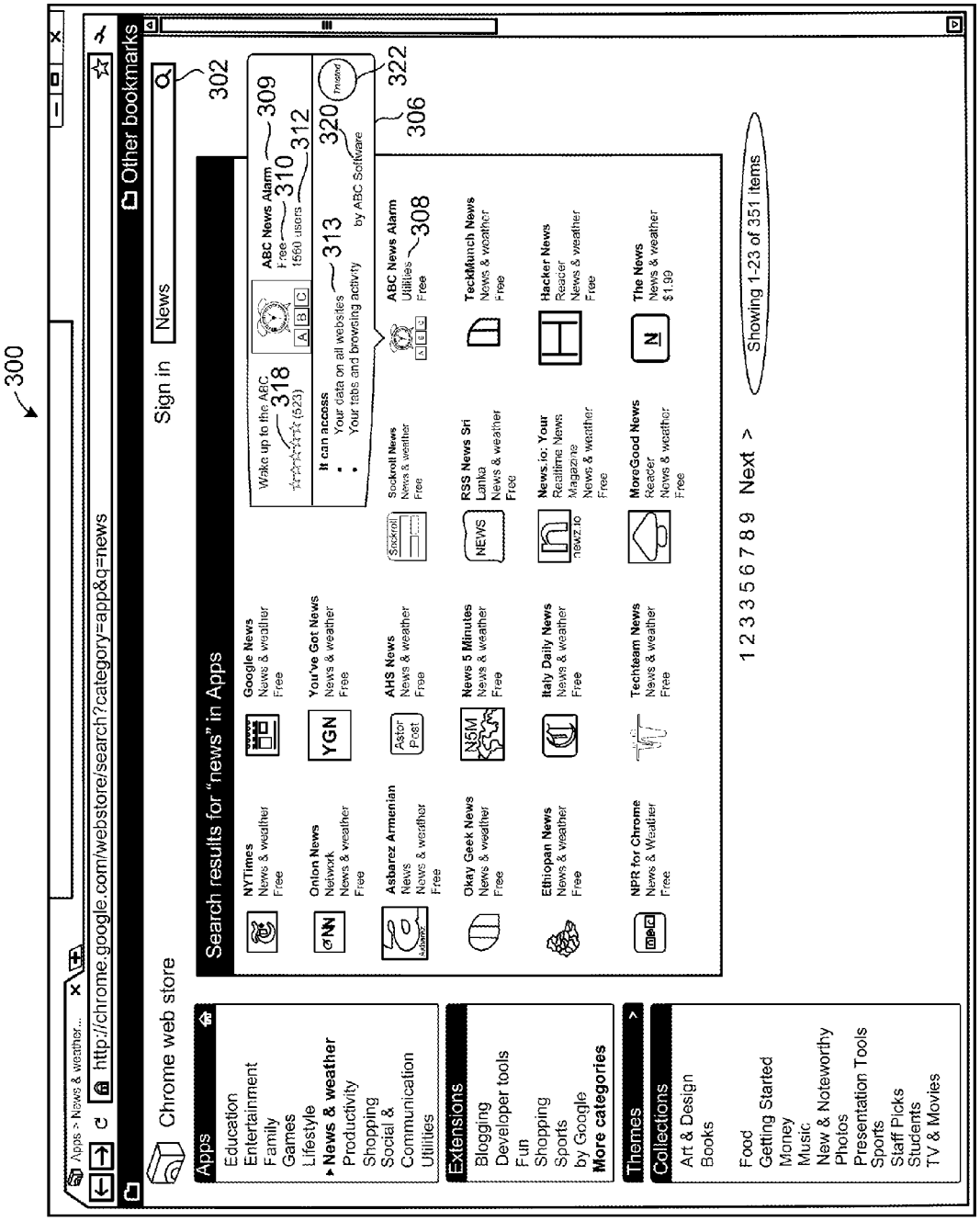
FIG. 3 illustrates a user interface for a web browser.

FIG. 3 illustrates a user interface 300 for a marketplace of digital goods. The user interface is an example of a screen that may be displayed when a user enters a query term "news" in query box 302 to search for web applications available in the marketplace that are related to news. The query term may be compared to metadata associated with digital goods, for example, data stored in digital goods repository 240. Based on the comparison, a query handler may identify one or more digital goods that are related to the query term. The applications that are selected for display in the user interface may be selected based on a ranking of the relative desirability of the identified applications. Furthermore, among the selected subset of applications, the position of the applications within the user interface 300 may be determined by their ranking For example, applications with higher rankings may be displayed in rows at the top of the user interface 300, and, within a row, applications with a higher ranking may be displayed on the left side of the row.

A pop-up (e.g., HTML) window 306 or a message may be displayed when a user moves a mouse icon over an icon for an application 308 that is displayed in the user interface 300. Within the pop-up window 306, a title field 309 may be displayed, along with an icon representing the application 308. Additional information about the web application 308 may also be displayed within pop-up window 306. For example, a field 310 may indicate whether the application is free or the price that must be paid to be able to download and install the app. Another field 312 may indicate how many users have downloaded and/or installed and/or used the application. Information about the installation and/or use of the application on a client device may be transmitted from a browser executing the application of the client device to the server 350. Another field 313 may display descriptive information about the web application, such as permissions requested by the application (e.g., "It can access: Your data on all websites; Your tabs and browsing activity"). Another field 318 may display an average subjective rating that users have provided of the web application and a number of users that have rated the application. Another field 320 may display the name of the author or developer of the application, which may be an individual, group, or company name (such as "ABC Software").

Another field 322 may display information reflecting that web application 308 is trusted (or not trusted). For example, if the author ("ABC Software" as shown in field 320) is a verified author, field 322 may display a "trusted" indicator, as shown. As an example, as discussed above with respect to FIG. 2, site verification may be used to create a list of verified authors or trusted websites that provide digital goods (e.g., web applications or browser extensions to the digital marketplace). A developer may verify that he owns a domain (e.g., by changing a file on the domain to have some specific contents), and server 150 can associate an item (e.g., web application or browser application) with a verified domain.

Additional information, such as a written warning explaining why an application is or is not trusted may also be displayed, for example in a pop-up window. For example, a warning may be displayed that a website associated with the author (e.g., shown in field 320) has not been verified. The warning may indicate that the non-verified site may be a phishing site. Warnings may be tailored to a particular user. For example, a user who is more concerned with security may get additional, or more specific warnings than another user who is less concerned with security. For example, a user who does not wish to allow applications to access local storage media may receive warnings regarding any applications that request access to local storage media.

For users who browse the digital marketplace and find an item using interface 300, for example, it may be a very easy one-click process to install it. Yet if a user is already on another website such as a developer website, it can be cumbersome for them to complete an installation because they would need to navigate away from the website to the digital marketplace, complete the install process, and then return to the developer's website. In some implementations described herein, users may also install applications from a developer originated website (e.g., www.abcsoftware.com), yet have confidence that the applications are safe to install.

Developers can initiate web application and browser extension installations "inline" from their own website. When users install an application from a developer originated website, as discussed in more detail below with respect to FIG. 4, they may see an installation confirmation dialog similar to popup window 306. As with the popup window 306, which may be displayed when installing directly from the digital marketplace (e.g., user interface 300), the installation confirmation dialog may list permissions that a web application or browser extension is requesting. Additionally, the dialog may include an average rating and the number of users, giving users extra confidence about what they are about to install, as discussed in more detail below with respect to FIG. 4.

Developer Originated Website User Interface

Figure 4:
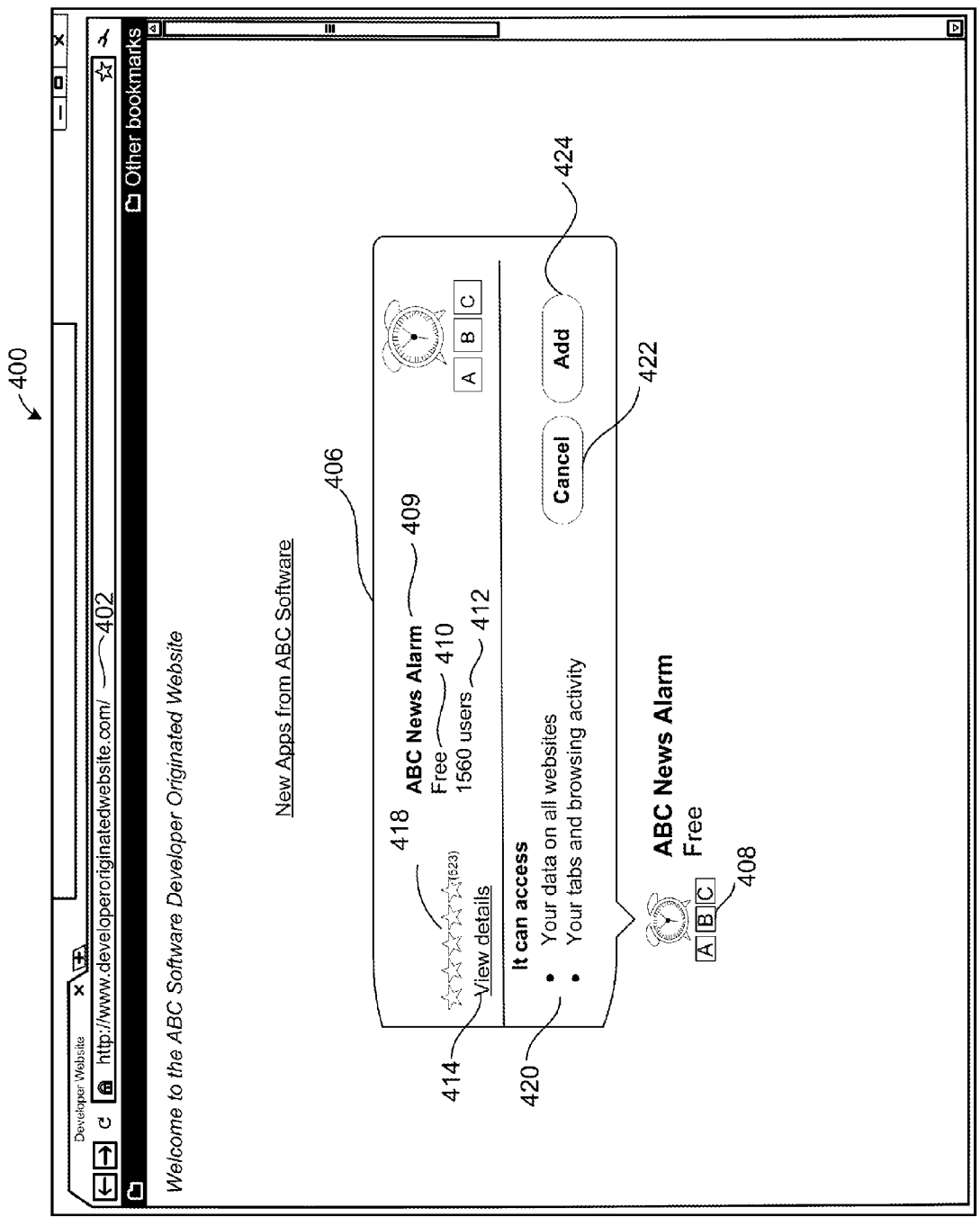
FIG. 4 illustrates another user interface for a web browser.

FIG. 4 illustrates a user interface 400 for a developer originated website. The user interface is an example of a screen that may be displayed when a user navigates to a developer originated website, for example to search for web applications available from a specific developer. A user may navigate to the developer originated website by entering a URL 402 into a web browser or by otherwise accessing the website using a web browser (e.g., via linking from a search engine or e-mail, clicking a bookmark, activating a browser extension, etc.).

The user may trigger an inline installation from the developer originated website (e.g., a user click on an icon on the developer originated website). For example, if a user selects an icon 408 representing a web application or browser extension, or otherwise initiates a download or installation of the web application or browser extension, the developer originated website may provide information to the user about the web application or browser extension. The information may be provided prior to or during installation. For example, if the user clicked on web application icon 408, a pop-up window 406 may be displayed prior to installation. Alternatively or additionally, the pop-up window 406 may be also displayed when a user moves a mouse icon over icon 408, or when a user touches an area near the icon 408 when using a computing device with a touch-screen, such as a smartphone or tablet.

Within the pop-up window 406, the title of the application 409 may be displayed, and additional information about the web application 408 may also be displayed. The information shown in pop-up window 406 may received by the browser after being transmitted from server 150 to the browser, for example after an API located on server 150 is invoked by the developer-originated website, as discussed in more detail below. Server 150 may store the information (e.g., in metadata 246 stored in digital goods repository 240, as shown in FIG. 2) and server 150 may also update the information on a periodic basis, for example to provide updated user reviews.

The information may include metadata associated with the web application. For example, a field 410 may indicate whether the web application is free, or the price that must be paid to be able to download and install the app. Another field 412 may indicate how many users have downloaded, installed, and/or used the application or an equivalent application stored in server 150. Another field 414 may display descriptive information about the web application that supplements information in the title field 416. Field 414 may include a "View details" link that, when selected, takes a user to digital marketplace user interface 400, which may be used to verify information shown in window 406. Another field 418 may display an average subjective rating that users have provided of the web application and a number of users that have rated the application. Another field 420 may display at least some of the permissions requested by the application.

With inline installation, a user knows exactly what is being installed, such that a developer may not have two items (e.g., A and B) presented in a digital marketplace or website, where A is a benign-seeming application and B is a malicious looking application, and include the inline install metadata for A but actually install B. There are various ways of protecting against this type of scenario. First, instead of downloading the web application or browser extension from the developer's server (e.g., from web application origin 170 or browser extension origin 180), a user may download the web application or browser extension from the digital marketplace directly (e.g., from server 150 in a .crx or other packaged file format), for example without navigating away from the developer originated website (e.g., 402). Alternatively or additionally, a user may download the web application or browser extension from the developer's server, but before installing any downloaded data, the browser application 112 may verify that the downloaded data matches the item for which the window 406 was shown (for example, verifying the downloaded data using a cryptographic signature). In that case, a user may still view what permissions the web application or browser extension may require, and may see how others have reviewed the web application or browser extension. Further, the user may know that the web application or browser extension may automatically update and/or be blacklisted if there are security concerns about the web application or browser extension, without the user having to be proactive about seeking patches or bulletins. In such a way, the user may retain all benefits of being on a digital marketplace or web store, while still remaining on a developer originated website.

In some implementations, pop-up window 406 may also include a cancel button 422 and an add button 424, to allow the user to cancel or proceed with installation of the application, for example after viewing the information in pop-up window 406. The specific depiction of window 406 is merely for illustration and the elements shown in window 406 may be modified, rearranged, added to, or deleted. For example, field 412 may be removed such that a user does not see how many other users have installed the application.

Triggering Inline Installation

Inline installation allows a developer to choose when to prompt a user to install a web application or browser extension. If the item is critical to a website, the developer may include a modal dialog or other distinctive noticeable user interface element for prompting the user to install the web application or browser extension. If the item only provides secondary functionality, inline installation may be hidden away on a secondary page of the website. Since inline installation is triggered via a user gesture (for example, a mouse click) the installation action may be tied to a clickable user interface element such as a button or icon (e.g., icon 408). In some implementations, a website may prompt a user to install a web browser extension related to the website. The information shown in pop-up window 406 may received by the browser after being transmitted from server 150 to the browser, for example after an API located on server 150 is invoked by the developer-originated website, after being triggered via the user gesture.

In some implementations, to begin inline installation, a function (e.g., digital.webstore.install (url, successCallback, failureCallback)) may be called in response to a user gesture, for example within a click event handler. The function may have the following parameters: url (optional string). If the developer originated website has more than one <link> tag on a page with the digital-webstore-item relation, the developer can choose which item the developer would like to make available for install by passing in its URL using url (optional string). If it is omitted, then the first (or only) link may be used. An exception may be thrown if the passed in URL does not exist on the page.

A successCallback (optional function) function may be invoked when inline installation successfully completes (for example, after user clicks add button 424). This function may be used to hide the user interface element that prompted the user to install the web application or browser extension.

AfailureCallback (optional function) function may be invoked when inline installation does not successfully complete. Possible reasons for this include the user canceling the dialog (e.g., by pressing cancel button 422), an equivalent linked item not being found in the digital marketplace or server 150, or the install being initiated from a non-verified site. The callback is given a failure detail string as a parameter. A developer may inspect or log the failure detail string for debugging purposes.

Figure 5:
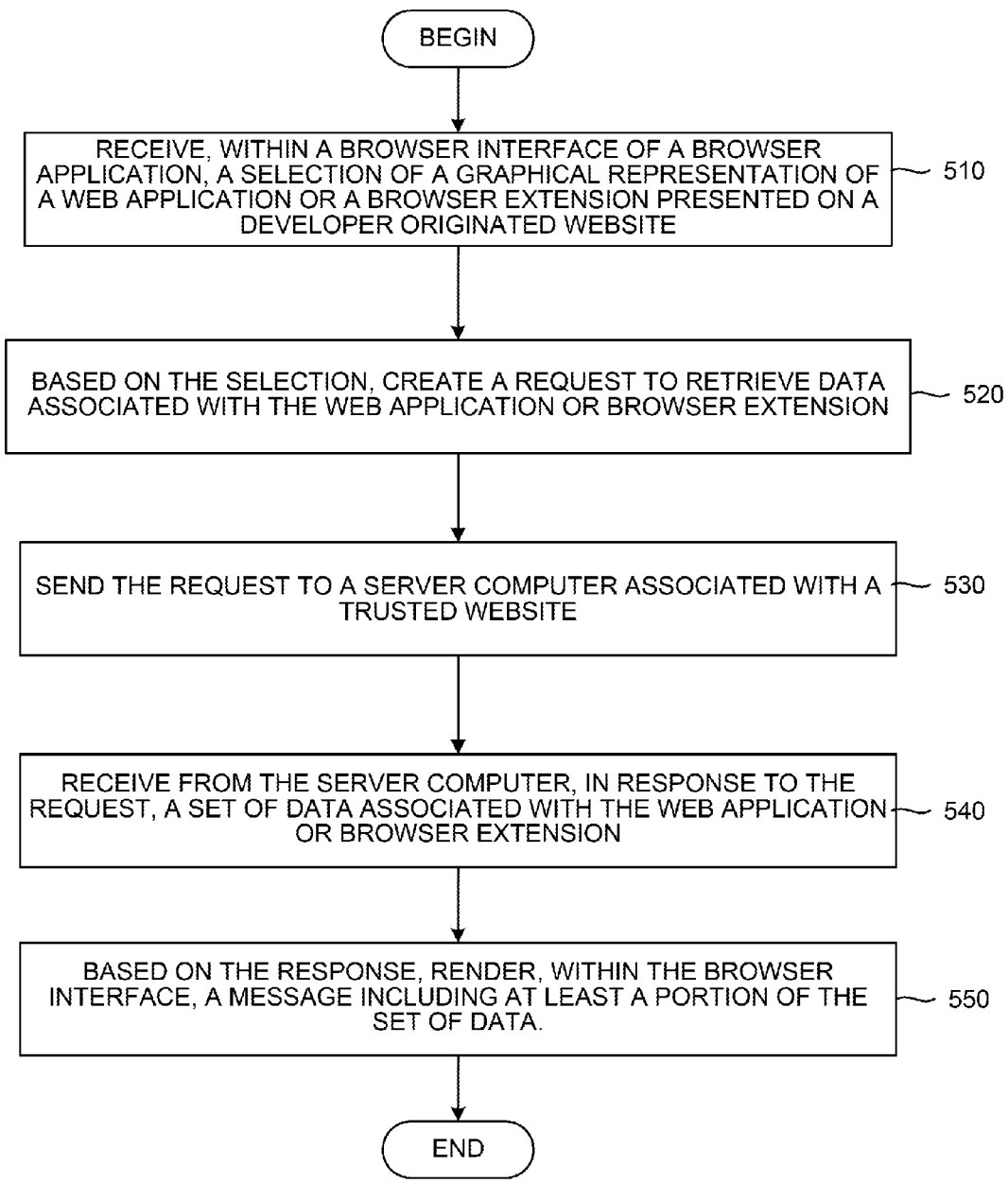
FIG. 5 illustrates a flowchart of a process for enabling inline installation of web applications and browser extensions.

FIG. 5 is a flowchart of a process for enabling inline installation of web applications and browser extensions. The inline installation of web applications and browser extensions may be initiated from non-trusted sources, such as from developer originated websites. The flowchart shown in FIG. 5 may be performed at least in part by a browser application of a computing device (e.g., browser application 112 of computing device 110 shown in FIG. 1). A selection of a graphical representation of a web application or a browser extension presented on a developer originated website is received within a browser interface of a browser application (510). For example, a user may click on icon 408 as shown in FIG. 4. Based on the selection, a request is created to retrieve data associated with the web application or browser extension (520). The request is sent to a server computer associated with a trusted website (530) (e.g., server 150 shown in FIG. 1). In response to the request, the browser application receives a set of data associated with the web application or browser extension (540). The data may include, for example, permissions, user reviews, ratings, capabilities, file size, author, ranking, or other metadata associated with the web application or browser extension. The set of data may also include a link to a version of the web application or browser extension stored at the server. Based on the response, the browser application renders, within the browser interface, a message including at least a portion of the set of data. (550). For example, as shown in FIG. 4, window 406 includes fields 412 (number of users), 418 (average subjective rating that users have provided of the web application and a number of users that have rated the application), and 420 (at least some of the permissions requested by the application). The process shown in FIG. 5 may have steps added, modified, or deleted. For example, the process may include site verification to verify that a developer actually owns the website, and may also include utilization of an API at a server. The process shown in FIG. 5 may be performed without requiring a user to navigate away from a first website, and may be invisible to a user who is seeking to download an application from the first website.

Figure 6:
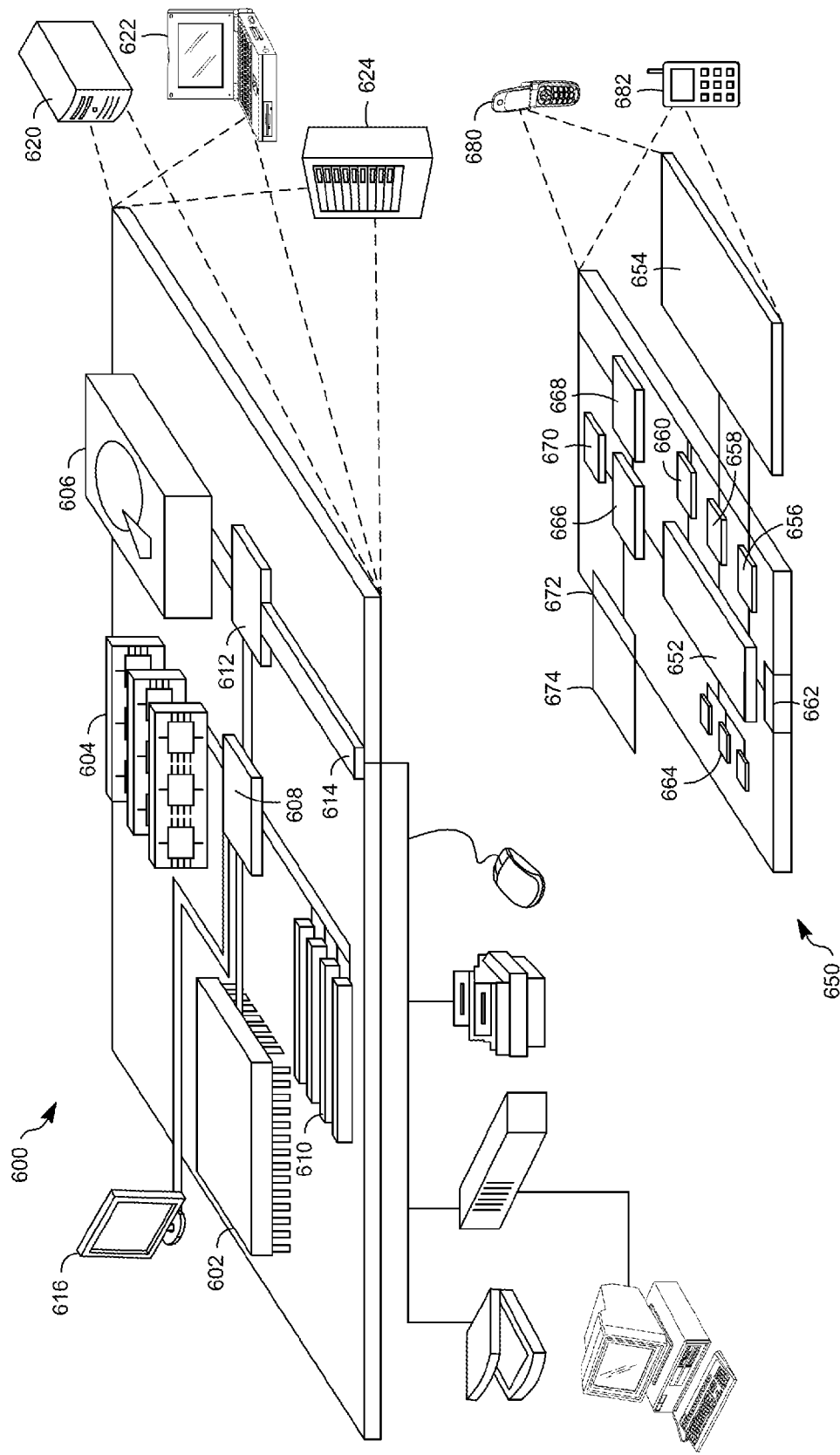
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   communicating, by a server, with a web browser configured to display web pages of one or more websites on a client device;
   in response to receiving an indication of a display, on a web page of a first website, of an availability of a web application or browser extension downloadable from the first website for installation in the web browser,
   determining, by the server, a trustworthiness of the web application or browser extension downloadable from the first website, including at least one of:
   determining whether the first website is a previously verified website or a non-verified website; and
   determining whether the web application or browser extension downloadable from the first website is the same as an equivalent web application or browser extension available in a digital marketplace hosted by a trusted site;
   displaying, by the server on the web page of the first website, the trustworthiness of the web application or browser extension downloadable from the first website; and
   downloading the web application or browser extension without navigating away from the web page of the first website,
   wherein the downloading the web application or browser extension includes:
   downloading the web application or browser extension from a third party server associated with the first website, the third party server being distinct from any servers associated with the digital marketplace; and
   verifying that the downloaded web application or browser extension matches a version of the web application or browser extension stored at a remote server associated with the digital marketplace.

2. The method of claim 1, wherein determining whether the first website is a previously verified website or a non-verified website includes verifying ownership of a domain of the first website.

3. The method of claim 1, wherein the display is provided in a pop-up window provided by the web browser.

4. The method of claim 1, wherein the display includes a link to verify a portion of the display at another internet domain.

5. The method of claim 1, wherein the downloading the web application or browser extension includes user-selection of a graphical element provided in a portion of the display.

6. The method of claim 1, the verifying includes using a cryptographic signature.

7. The method of claim 1, wherein the display includes a set of metadata associated with the web application or browser extension.

8. The method of claim 7, wherein the set of metadata includes all permissions that the web application or browser extension requests from a user.

9. The method of claim 7, wherein the set of metadata includes user ratings for the web application or browser extension.

10. The method of claim 7, wherein the set of metadata includes the number of users that have previously downloaded the web application, the browser extension, or an equivalent item from the digital marketplace.

11. The method of claim 1, wherein the display includes a warning about the web application or browser extension.

12. The method of claim 1, further comprising:
    allowing a user to install the web application without navigating away from an internet domain of the first website.

13. The method of claim 1, further comprising:
    providing a suggestion for another item to install from the first website based on the receiving the indication.

14. The method of claim 1, further comprising:
    verifying, by a remote server associated with the trusted site, ownership of the first website, using a uniform resource locator (URL) of the first website.

15. A system comprising:
    one or more memory devices arranged and configured to store executable code; and
    one or more processors operably coupled to the one or more memory devices, the one or more processors being arranged and configured to execute the code such that the system:
    communicates with a web browser that is configured to display web pages of one or more websites on a client device;
    in response to receiving an indication of a display, on a web page of a first website, of an availability of a web application or browser extension downloadable from the first website for installation in the web browser,
    determines a trustworthiness of the web application or browser extension downloadable from the first website by at least one of:
    determining whether the first website is a previously verified website or a non-verified website; and
    determining whether the web application or browser extension downloadable from the first website is the same as an equivalent web application or browser extension available in a digital marketplace hosted by a trusted site;
    displays on the web page of the first website, the trustworthiness of the web application or browser extension downloadable from the first website; and
    downloads the web application or browser extension without navigating away from the web page of the first website,
    wherein the downloading the web application or browser extension includes:

downloading the web application or browser extension from a third party server associated with the first website, the third party server being distinct from any servers associated with the digital marketplace; and verifying that the downloaded web application or browser extension matches a version of the web application or browser extension stored at a remote server associated with the digital marketplace.

16. A non-transitory computer readable medium including executable code that, when executed, is configured to cause a computing device to:

communicate with a web browser that is configured to display web pages of one or more websites on a client device;

in response to receiving an indication of a display, on a web page of a first website, of an availability of a web application or browser extension downloadable from the first website for installation in the web browser, determine a trustworthiness of the web application or browser extension downloadable from the first website by at least one of:

determining whether the first website is a previously verified website or a non-verified website; and determining whether the web application or browser extension downloadable from the first website is the same as an equivalent web application or browser extension available in a digital marketplace hosted by a trusted site;

display on the web page of the first website, the trustworthiness of the web application or browser extension downloadable from the first website; and download the web application or browser extension without navigating away from the web page of the first website, wherein the downloading the web application or browser extension includes:

downloading the web application or browser extension from a third party server associated with the first website, the third party server being distinct from any servers associated with the digital marketplace; and verifying that the downloaded web application or browser extension matches a version of the web application or browser extension stored at a remote server associated with the digital marketplace.

17. The system of claim 15, wherein the one or more processors are further arranged and configured to execute the code so that the system verifies that the web application or browser extension when downloaded from the first website matches a version of the web application or browser extension stored at a remote server associated with the digital marketplace.

18. The non-transitory computer readable medium of claim 16, wherein determining whether the first website is a previously verified website or a non-verified website includes verifying ownership of a domain of the first website.

\* \* \* \* \*